US012388657B2

(12) United States Patent
Azouaoui et al.

(10) Patent No.: US 12,388,657 B2
(45) Date of Patent: Aug. 12, 2025

(54) LOW-MEMORY MASKED DILITHIUM WITH ALTERNATIVE SIGNING ALGORITHM

(71) Applicant: NXP B.V., Eindhoven (NL)

(72) Inventors: Melissa Azouaoui, Norderstedt (DE); Mohamed ElGhamrawy, Hamburg (DE); Joost Roland Renes, 's-Hertogenbosch (NL); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 176 days.

(21) Appl. No.: 18/461,831

(22) Filed: Sep. 6, 2023

(65) Prior Publication Data

US 2025/0080342 A1 Mar. 6, 2025

(51) Int. Cl.
*H04L 9/32* (2006.01)
*H04L 9/08* (2006.01)

(52) U.S. Cl.
CPC ............ *H04L 9/3247* (2013.01); *H04L 9/088* (2013.01)

(58) Field of Classification Search
CPC ..................................................... H04L 9/3247
See application file for complete search history.

(56) References Cited

U.S. PATENT DOCUMENTS 11,416,638 B2 8/2022 Banerjee
11,496,297 B1 11/2022 Beckwith
2022/0012334 A1 1/2022 Ghosh
2023/0030316 A1* 2/2023 Pessl ........................ G06F 21/75
2024/0031164 A1* 1/2024 Ghosh ................... H04L 9/3247
2024/0119359 A1* 4/2024 Arbajian .................. G06N 5/04

FOREIGN PATENT DOCUMENTS

CN 112910649 A 6/2021
KR 102462395 B1 11/2022
WO 2021/240157 A1 12/2021

OTHER PUBLICATIONS

Aikata, Ahmet Can Mert, Malik Imran, Samuel Pagliarini, and Sujoy Sinha Roy, Kali: A crystal for post-quantum security using kyber and dilithium, IEEE Trans. CircuitsSyst. I Regul. Pap. 70 (2023), No. 2, 747-758.
Aikata Aikata, Ahmet Can Mert, David Jacquemin, Amitabh Das, Donald Matthews, Santosh Ghosh, and Sujoy Sinha Roy, A unified cryptoprocessor for lattice-based signature and key-exchange, IACR Cryptol. ePrint Arch. (2021), 1461.

(Continued)

*Primary Examiner* — Bradley W Holder

(57) ABSTRACT

A method of performing a Dilithium signature operation on a message M using a secret key sk, including: generating a polynomial y using an ExpandMask function; calculating a polynomial z based upon y, c, and $s_1$; performing a bound check on z based upon $\gamma_1$ and $\beta$; performing a bound check on $ct_0$ based upon $\gamma_2$; calculating a polynomial $\tilde{r}$ based upon A, z, c, t, $\alpha$, and $w_1$; performing a bound check on $\tilde{r}$ based upon $\gamma_2$ and $\beta$; calculating a hint polynomial h based on the $\tilde{r}$; and returning a digital signature of the message M where the digital signature includes z and h.

24 Claims, 3 Drawing Sheets

(56) References Cited

OTHER PUBLICATIONS

Melissa Azouaoui, Olivier Bronchain, Gaëtan Cassiers, Clément Hoffmann, Yulia Kuzovkova, Joost Renes, Markus Schönauer, Tobias Schneider, François-Xavier Standaert, and Christine van Vredendaal, Leveling dilithium against leakage: Revisited sensitivity analysis and improved implementations, IACR Cryptol. ePrint Arch. (2022), 1406.
Luke Beckwith, Abubakr Abdulgadir, and Reza Azarderakhsh, A flexible shared hardware accelerator for nist-recommended algorithms crystals-kyber and crystalsdilithium with sca protection, NIST Fourth PQC Standardization Conference (2022).
Joppe W. Bos, Joost Renes, and Amber Sprenkels, Dilithium for memory constrained devices, IACR Cryptol. ePrint Arch. (2022), 323.
Julien Devevey, Pouria Fallahpour, Alain Passelègue, and Damien Stehlé, A detailed analysis of fiat-shamir with aborts, IACR Cryptol. ePrint Arch. (2023), 245.
Léo Ducas, Eike Kiltz, Tancrède Lepoint, Vadim Lyubashevsky, Peter Schwabe, Gregor Seiler, and Damien Stehlé, Crystals-dilithium algorithm specifications and supporting documentation (version 3.1), 2021.
Denisa O. C. Greconici, Matthias J. Kannwischer, and Amber Sprenkels, Compact dilithium implementations on cortex-m3 and cortex-m4, IACR Cryptol. ePrint Arch.(2020), 1278.
Matthias J. Kannwischer, Joost Rijneveld, Peter Schwabe, and Ko Stoffelen, pqm4: Testing and benchmarking NIST PQC on ARM cortex-m4, IACR Cryptol. ePrint Arch. (2019), 844.
Georg Land, Pascal Sasdrich, and Tim Güneysu, A hard crystal—implementing dilithium on reconfigurable hardware, IACR Cryptol. ePrint Arch. (2021), 355.
Yuejun Liu, Yongbin Zhou, Shuo Sun, Tianyu Wang, Rui Zhang, and Jingdian Ming, On the security of lattice-based fiat-shamir signatures in the presence of randomness leakage, IEEE Trans. Inf. Forensics Secur. 16 (2021), 1868-1879.
Soundes Marzougui, Vincent Ulitzsch, Mehdi Tibouchi, and Jean-Pierre Seifert, Profiling side-channel attacks on dilithium: A small bit-fiddling leak breaks it all, IACR Cryptol. ePrint Arch. (2022), 106.
Vincent Migliore, Benoît Gérard, Mehdi Tibouchi, and Pierre-Alain Fouque, Masking dilithium: Efficient implementation and side-channel evaluation, IACR Cryptol. ePrint Arch. (2019), 394.
National Institute of Standards and Technology, Post-quantum cryptography standardization, https://csrc.nist.gov/Projects/Post-Quantum-Cryptography/Post-Quantum-Cryptography-Standardization.
Hauke Malte Steffen, Georg Land, Lucie Johanna Kogelheide, and Tim Güneysu, Breaking and protecting the crystal: Side-channel analysis of dilithium in hardware, IACR Cryptol. ePrint Arch. (2022), 1410.
Cankun Zhao, Neng Zhang, Hanning Wang, Bohan Yang, Wenping Zhu, Zhengdong Li, Min Zhu, Shouyi Yin, Shaojun Wei, and Leibo Liu, A compact and high-performance hardware architecture for crystals-dilithium, IACR Trans. Cryptogr. Hardw. Embed. Syst. 2022 (2022), No. 1, 270-295.
Improved Gadgets for the High-Order Masking of Dilithium. Anonymous submission to TCHES issue 4.
U.S. Appl. No. 18/366,384, filed Aug. 7, 2023.
U.S. Appl. No. 17/935,550, filed Sep. 26, 2022.
U.S. Appl. No. 18/320,028, filed May 18, 2023.
U.S. Appl. No. 17/835,898, filed Jun. 8, 2022.

* cited by examiner

```
while (z,h) = ⊥ do
        y = ExpandMask(ρ',κ)
        w = Ay
        (w0,w1) = Decompose(w,2γ2)
        c̃ = H (μ||w1)
        c = SampleInBall(c̃)
        z = y + cs1
        r̃ = w0 - cs2
        if ||z||∞ ≥ γ1 − β or ||r̃||∞ ≥ γ2 − β then (z,h) = ⊥
        else
                h = MakeHint(r̃,c,t0,w1,γ2)
                if ||ct0||∞ ≥ γ2 or the # of 1's in h is greater than ω then (z,h) = ⊥
        κ = κ + ι
return σ = (c̃,z,h)
```

```
while (z,h) = ⊥ do
    y = ExpandMask(ρ',κ)
    for i = 0 to k - 1:
            w1[i] = HighBits(Σ_{j=0}^{l-1} A[i,j] y[j], 2γ2)
    c̃ = H(μ||w1)
      c = SampleInBall(c̃)
      z = y + cs1
      if ||z||∞ ≥ γ1 − β or ||Ct0||∞ ≥ γ2 then (z,h) = ⊥
      i = 0
      while (i < k and (z, h) ≠⊥) do
            r̃[i] = Az[i] - ct[i] - αw1[i]
            if ||r̃[i]||∞ ≥ γ2 − β then (z,h) = ⊥
            else
                  h[i] = MakeHint(r̃,[i],c,t0[i],w1[i],γ2)
            i = i + 1
      if (z,h) ≠ ⊥ then
            if # of 1's in h is greater than ω then (z,h) =⊥
      κ = κ + l
return σ = (c̃,z,h)
```

LOW-MEMORY MASKED DILITHIUM WITH ALTERNATIVE SIGNING ALGORITHM

FIELD OF THE DISCLOSURE

Various exemplary embodiments disclosed herein relate to low-memory masked Dilithium with alternative signing algorithm.

BACKGROUND

Recent significant advances in quantum computing have accelerated the research into post-quantum cryptography schemes: cryptographic algorithms which run on classical computers but are believed to be still secure even when faced against an adversary with access to a quantum computer. This demand is driven by interest from standardization bodies such as the call for proposals for new public-key cryptography standards by the National Institute of Standards and Technology (NIST). The first selection procedure for this new cryptographic standard has ended and the lattice-based digital signature scheme Dilithium has been selected by the NIST as one of the future standards for post-quantum cryptography.

SUMMARY

A summary of various exemplary embodiments is presented below.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Various embodiments relate to a method of performing a Dilithium signature operation on a message M using a secret key sk, including: generating a polynomial y using an ExpandMask function; calculating a polynomial z based upon y, c, and $s_1$, where $s_1$ is part of the secret key sk and replacing y with z in a memory; performing a bound check on z based upon $\gamma_1$ and $\beta$, where $\gamma_1$ and $\beta$ are parameters of the Dilithium signature operation; performing a bound check on $ct_0$ based upon $\gamma_2$, where $\gamma_2$ is a parameter of the Dilithium signature operation, c is based upon a hash of the message M, and polynomial $t_0$ is part of the secret key sk; calculating a polynomial $\tilde{r}$ based upon A, z, c, t, $\alpha$, and $w_1$, where A and $w_1$ are calculated as part of the Dilithium signature operation, $\alpha$ is a parameter of the Dilithium signature operation, and polynomial t is the addition of the polynomial $t_1$ scaled by $2^d$ and the polynomial $t_0$ where polynomial $t_1$ is part of a public key pk; performing a bound check on $\tilde{r}$ based upon $\gamma^2$ and $\beta$; calculating a hint polynomial h based on the $\tilde{r}$; and returning a digital signature of the message M where the digital signature includes z and h.

Various embodiments are described, wherein calculating z includes calculating $z=y+cs_1$.

Various embodiments are described, wherein performing a bound check on z includes determining if $\|z\|_\infty \geq \gamma_1-\gamma$.

Various embodiments are described, wherein performing a bound check on $ct_0$ includes determining if $\|ct_0\|_\infty \geq \gamma_2$.

Various embodiments are described, wherein calculating a polynomial $\tilde{r}$ includes repeating for each polynomial vector element of the polynomial $\tilde{r}$ the steps of: calculating one polynomial vector element of the polynomial $\tilde{r}$ based upon A, z, c, t, $\alpha$, and $w_1$; performing a bound check on the one polynomial vector element of $\tilde{r}$ based upon $\gamma_2$ and $\beta$; and calculating one polynomial vector element of the hint polynomial h based on the $\tilde{r}$.

Various embodiments are described, wherein calculating a polynomial $\tilde{r}$ includes calculating $\tilde{r}[i]=Az[i]-ct[i]-\alpha w_1[i]$ where i is an integer index specifying a polynomial of the vectors $\tilde{r}$, z, t, and $w_1$.

Various embodiments are described, wherein performing a bound check on $\tilde{r}$ includes determining if $\|\tilde{r}[i]\|_\infty \geq \gamma_2-\beta$.

Various embodiments are described, wherein calculating a hint polynomial h is further based on c, $t_0$, $w_1$, and $\gamma_2$, where to is part of the secret key sk, where $w_1$ is calculated as part of the Dilithium signature operation, and where $\gamma_2$ is a parameter of the Dilithium signature operation.

Various embodiments are described, wherein calculating a polynomial $\tilde{r}$ includes calculating $\tilde{r}[i]=Az[i]-c(As_1[i]+s_2[i])-\alpha w_1[i]$ where i is an integer index specifying a polynomial of the vectors $\tilde{r}$, z, $s_1$, $s_2$, and $w_1$.

Various embodiments are described, wherein calculating a polynomial $\tilde{r}$ includes calculating $\tilde{r}[i]=A(z[i]-cs_1[i])-cs_2[i]-\alpha w_1[i]$ where i is an integer index specifying a polynomial of the vectors $\tilde{r}$, z, $s_1$, $s_2$, and $w_1$.

Various embodiments are described, further including determining if a number of 1's in h is greater than $\omega$, where $\omega$ is a parameter of the Dilithium signature operation.

Various embodiments are described, wherein $\tilde{r}$, z, and y are masked using a plurality of shares.

Further various embodiments relate to a data processing system including instructions embodied in a non-transitory computer readable medium, the instructions for a method of performing a Dilithium signature operation on a message M using a secret key sk, the instructions, including: generating a polynomial y using an ExpandMask function; calculating a polynomial z based upon y, c, and $s_1$, where $s_1$ is part of the secret key sk and replacing y with z in a memory; performing a bound check on z based upon $\gamma_1$ and $\beta$, where $\gamma_1$ and $\beta$ are parameters of the Dilithium signature operation; performing a bound check on $ct_0$ based upon $\gamma_2$, where $\gamma_2$ is a parameter of the Dilithium signature operation, c is based upon a hash of the message M, and polynomial $t_0$ is part of the secret key sk; calculating a polynomial $\tilde{r}$ based upon A, z, c, t, $\alpha$, and $w_1$, where A and $w_1$ are calculated as part of the Dilithium signature operation, $\alpha$ is a parameter of the Dilithium signature operation, and polynomial t is the addition of the polynomial $t_1$ scaled by $2^d$ and the polynomial $t_0$ where polynomial $t_1$ is part of a public key pk; performing a bound check on $\tilde{r}$ based upon $\gamma_2$ and $\beta$; calculating a hint polynomial h based on the $\tilde{r}$; and returning a digital signature of the message M where the digital signature includes z and h.

Various embodiments are described, wherein calculating z includes calculating $z=y+cs_1$.

Various embodiments are described, wherein performing a bound check on z includes determining if $\|z\|_\infty \geq \gamma_1-\beta$.

Various embodiments are described, wherein performing a bound check on $ct_0$ includes determining if $\|ct_0\mu_\infty \geq \gamma_2$.

Various embodiments are described, wherein calculating a polynomial $\tilde{r}$ includes repeating for each polynomial vector element of the polynomial $\tilde{r}$ the steps of: calculating one polynomial vector element of the polynomial $\tilde{r}$ based upon A, z, c, t, $\alpha$, and $w_1$; performing a bound check on the one polynomial vector element of $\tilde{r}$ based upon $\gamma_2$ and $\beta$; and calculating one polynomial vector element of the hint polynomial h based on the $\tilde{r}$.

Various embodiments are described, wherein calculating a polynomial $\tilde{r}$ includes calculating $\tilde{r}[i]=Az[i]-ct[i]-\alpha w_1[i]$ where i is an integer index specifying a polynomial of the vectors $\tilde{r}$, z, t, and $w_1$.

Various embodiments are described, wherein performing a bound check on $\tilde{r}$ includes determining if $\|\tilde{r}[i]\|_\infty \geq \gamma_2-\beta$.

Various embodiments are described, wherein calculating a hint polynomial h is further based on c, $t_0$, $w_1$, and $\gamma_2$, where $t_0$ is part of the secret key sk, where $w_1$ is calculated as part of the Dilithium signature operation, and where $\gamma_2$ is a parameter of the Dilithium signature operation.

Various embodiments are described, wherein calculating a polynomial $\tilde{r}$ includes calculating $\tilde{r}[i]=Az[i]-c(As_1[i]+s_2[i])-\alpha w_1[i]$ where i is an integer index specifying a polynomial of the vectors $\tilde{r}$, z, $s_1$, $s_2$, and $w_1$.

Various embodiments are described, wherein calculating a polynomial $\tilde{r}$ includes calculating $\tilde{r}[i]=A(z[i]-cs_1[i])-cs_2[i]-\alpha w_1[i]$ where i is an integer index specifying a polynomial of the vectors $\tilde{r}$, z, $s_1$, $s_2$, and $w_1$.

Various embodiments are described, further including determining if a number of 1's in h is greater than $\omega$, where $\omega$ is a parameter of the Dilithium signature operation.

Various embodiments are described, wherein $\tilde{r}$, z, and y are masked using a plurality of shares.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
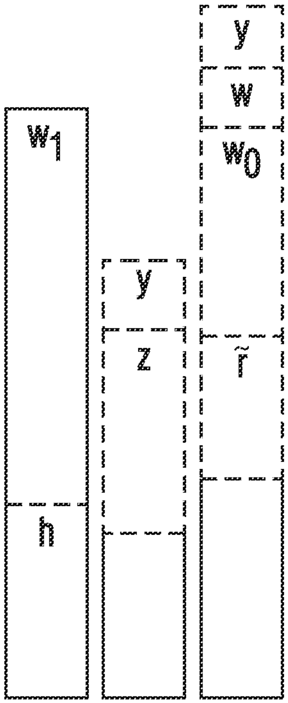
FIG. 1 illustrates the memory lifetime of different variables during a standard Dilithium signature generation following Algorithm 2.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of post-quantum cryptography digital signature systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies such as the call for proposals for new public-key cryptography standards by the National Institute of Standards and Technology (NIST). The first selection procedure for this new cryptographic standard has ended and the lattice-based digital signature scheme Dilithium has been selected by the NIST as one of the future standards for post-quantum cryptography.

This disclose presents a method of computing a Dilithium signature which reduces its runtime memory footprint and improves its speed when masking against side-channel attacks. On memory constrained devices, because the two large masked vectors y and $w_0$ are needed to compute the signature, the usual strategy is to overwrite y with $w_0$ and simply re-generate y when needed again. However, this incurs additional overhead (the ExpandMask function used to derive y is expensive to mask) and also additional leakage on the sensitive variable y (the ExpandMask function entails bit manipulations of the shares of y). The invention proposes an alternative way of computing the vector $\tilde{r}$, which does not require w in full (i.e., only one polynomial of the vector at a time) or $w_0$ to compute the signature. This means that y can be kept in memory and the implementation does not require a second call to ExpandMask. This improves the memory footprint, the efficiency of the signature generation, and depending on the devices' leakage properties, its side-channel security.

First the relevant algorithms for Dilithium and the corresponding parameter sets are disclosed. Notably, there are two versions of the signing algorithm: a deterministic version and a randomized version.

Table 1 below provides the values of the Dilithium parameters for different NIST security levels.

TABLE 1

| NIST Security level | 2 | 3 | 5 |
|---|---|---|---|
| q (modulus) | $2^{23}-2^{13}+1$ | $2^{23}-2^{13}+1$ | $2^{23}-2^{13}+1$ |
| d (number of dropped bits from t) | 13 | 13 | 13 |

TABLE 1-continued

| NIST Security level | 2 | 3 | 5 |
|---|---|---|---|
| $\tau$ (# of ± 1's in c) | 39 | 49 | 60 |
| $\gamma_1$ (y coefficient range) | $2^{17}$ | $2^{19}$ | $2^{19}$ |
| $\gamma_2$ (low order rounding range) | $(q-1)/88$ | $(q-1)/32$ | $(q-1)/32$ |
| (k, l) (dimensions of A) | (4, 4) | (6, 5) | (8, 7) |
| $\eta$ (secret key range) | 2 | 4 | 2 |
| $\beta$ ($=\tau \cdot \eta$) | 78 | 196 | 120 |
| $\omega$ (max. # 1's in h) | 80 | 55 | 75 |
| average number of signing iterations | 4.25 | 5.1 | 3.85 |

Algorithm 1 below provides a description of the key generation procedure in Dilithium. In the current Dilithium specification (version 3.1), the secret key K is only used for deterministic signing. The future Dilithium standard edited by the NIST might include K in randomized signing as well.

Algorithm 1-KeyGen

1: $\zeta \leftarrow \{0,1\}^{256}$ ▷ cryptographic random seed
2: $(\rho, \varsigma, K) = H(\zeta)$ ▷ $(\rho, \varsigma, K) \in \{0,1\}^{256} \times \{0,1\}^{512} \times \{0,1\}^{256}$
3: $A = \text{ExpandA}(\rho)$ ▷ $A \in R^{k \times l}$
4: $(s_1, s_2) = \text{ExpandS}(\varsigma)$ ▷ $(s_1, s_2) \in S_\eta^{\,l} \times S_\eta^{\,k}$
5: $t = As_1 + s_2$
6: $(t_1, t_0) = \text{Power2Round}(t, d)$
7: $tr = H(\rho \| t_1)$ ▷ $tr \in \{0,1\}^{256}$
8: return $pk = (p, t_1)$, $sk = (\rho, K, tr, s_1, s_2, t_0)$ Algorithm 2 below provides a description of the signature generation procedure in Dilithium. The main difference between deterministic and randomized signatures lies in Algorithm 2, line 4. The secret seed $\rho'$ used to generate the secret masking vector y is either derived from the secret key K and the hash $\mu$ of the message or generated from a TRNG. The final NIST standard might use K to derive y in both deterministic and randomized versions, however this does not affect the method described in this disclosure. The Dilithium specification (version 3.1) document describes two versions of implementing Dilithium: the first less efficient one using r and the second more efficient using $\tilde{r}$.

Algorithm 2-Sign(sk,M)

1: $A = \text{ExpandA}(\rho)$
2: $\mu = H(tr \| M)$ ▷ $\mu \in \{0,1\}^{512}$
3: $\kappa = 0$, $(z, h) = \perp$
4: $\rho' = H(K \| \mu)$ (or $\rho' \xleftarrow{\$} \{0,1\}^{512}$ for randomized signing) ▷ $\rho' \in \{0,1\}^{512}$
5: while $(z, h) = \perp$ do
6: $y = \text{ExpandMask}(\rho', \kappa)$ ▷ $y \in \tilde{S}_{\gamma_1}^{\,l}$
7: $w = Ay$
8: $(w_0, w_1) = \text{Decompose}(w, 2\gamma_2)$
9: $\tilde{c} = H(\mu \| w_1)$ ▷ $\tilde{c} \in \{0,1\}^{256}$
10: $c = \text{SampleInBall}(\tilde{c})$ $c \in B_\tau$
11: $z = y + cs_1$
12: $\tilde{r} = w_0 - cs_2$
13: if $\|z\|_\infty \geq \gamma_1 - \beta$ or $\|\tilde{r}\|_\infty \geq \gamma_2 - \beta$ then $(z, h) = \perp$
14: else
15: $h = \text{MakeHint}(\tilde{r}, c, t_0, w_1, \gamma_2)$
16: if $\|ct0\|_\infty \geq \gamma_2$ or the # of 1's in h is greater than $\omega$ then $(z, h) = \perp$
17: $\kappa = \kappa + 1$
18: return $\sigma = (\tilde{c}, z, h)$ Algorithm 3 provides a description of the signature verification procedure in Dilithium.

Algorithm 3-Verify(pk,M, $\sigma = (\tilde{c}, z, h)$)

1: $A = \text{ExpandA}(\rho)$
2: $\mu = H(H(\rho \| t_1) \| M)$
3: $c = \text{SampleInBall}(\tilde{c})$
4: $w_1' = \text{UseHint}(h, Az - ct_1 \cdot 2^d, 2\gamma_2)$
5: return $[\![ \|z\|_\infty < \gamma_2 - \beta ]\!]$ ^ $[\![ \tilde{c} = H(\mu \| w_1') ]\!]$ ^ $[\![$ # of 1's in h is at most $\omega ]\!]$ As is the case with all cryptographic schemes, embedded implementations of Dilithium can be targeted by Side-Channel Attacks (SCA). SCA exploits data dependencies in physical measurements of the target device (e.g., power consumption) to recover secret keys and may be thwarted by masking the processed data. However, masking increases the memory footprint of implementations because any sensitive data is split up into multiple shares. This is in particular very challenging for Dilithium's signature generation algorithm due to its high memory requirements. Indeed, the reference and optimized implementations of Dilithium in the benchmarking framework pqm4 (using a Cortex-M4 microcontroller) require 50 to 100 KiB of memory. This is not only attributed to the relatively large key and signature size, but also the heavy use of stack space for the storage of intermediate data during Dilithium's signature generation.

The next paragraphs explain why executing a masked implementation of Dilithium on memory constrained devices (with 4 to 32 KiB of SRAM) while maintaining reasonable latency is quite a challenge.

One of the properties of Dilithium that affects its runtime memory is that it follows the Fiat-Shamir with aborts framework, which entails that some intermediate variables, namely z which is returned as part of the signature and $\tilde{r}$ in Algorithm 2 are considered sensitive (and hence need to remain masked) until both norm checks at line 13 in Algorithm 2 have passed. As a result, when masking with only 2 shares, more than 11 KiB, 16 KiB and 22 KiB are needed for z and $\tilde{r}$ only (ignoring other variables), for Dilithium level II, III and V, respectively. For most embedded systems this is not feasible and entails the need for efficient implementation strategies that reduce the runtime memory. One such strategy was given in U.S. patent application Ser. No. 18/366,384, filed Aug. 7, 2023, titled "LOW-MEMORY DILITHIUM WITH MASKED HINT VECTOR COMPUTATION" (the '384 application). The '384 application however did not solve the problem described hereafter.

Among the most sensitive variables in Dilithium's signing process is the vector of polynomials y. Any kind of side-channel leakage (e.g., bit, sign, or zero-value leakage) of a single coefficient of y over multiple signatures leads to key recovery. In Algorithm 2, y is first sampled pseudo randomly at line 6, using the ExpandMask function which parses the output bit-streams of multiple hash expansions of the seed ρ' and counter values. It is then converted to the NTT domain (by calling NTT(y)) and then multiplied by the public matrix A to produce the vector of polynomials w at line 7. The vector w is decomposed into a low part $w_0$ and a relatively smaller high part $w_1$ (which is not sensitive for valid signatures and recently shown in the literature not to be sensitive for aborted signatures). The vector y is later again needed to compute z at line 11. The vector w, and accordingly $w_0$, are also sensitive and require protection against SCA because recovering y (and hence $s_1$) or $s_2$ from w or $w_0$ is trivial. However, for memory constrained devices, a masked y and a masked $w_0$ cannot both remain in memory because that entails when masking with only 2 shares, more than 11 KiB, 16 KiB and 22 KiB of memory needed (ignoring all other variables), for Dilithium level II, III and V, respectively. Naturally, masking with more shares would increase the memory required.

One possible and straightforward solution is to re-generate y when needed. Because it is pseudo randomly sampled from a seed, this is indeed possible. While not a feature, this strategy is used in the '384 application. Essentially, the full vector w is stored because it is needed in the following decomposition, while for y one element is stored at a time to compute the elements of w. Later, when computing z, y is re-generated and again the elements of z overwrite those of y. This method of computing Dilithium signatures allows for some memory to be saved, which can then be used for other variables. However, it also introduces some significant drawbacks both in terms of performance and security.

In a first drawback, the masked generation of y corresponds to approximately half of the total runtime for software implementations. For instance, for a 2 share implementation on an ARM Cortex-M4 microcontroller, the ExpandMask function takes ≈13 million clock cycles compared to one signing iteration which takes ≈25 million clock cycles. A similar pattern is observed for a higher number of shares. This means that by re-generating y a second time a 50% overhead is incurred in this case, which is quite significant. This is due to the many masked SHAKE hash function calls needed to generate the full vector y.

In a second drawback, by re-generating y the amount of leakage that an attacker can observe on y doubles. As previously mentioned, leaked information on y leads to key recovery. This is furthermore so critical because the ExpandMask function parses a bit-stream to sample the coefficients of y, as opposed to arithmetic operations which process the coefficients of y modulus q.

This disclosure presents an alternative way of computing masked Dilithium signatures that reduces its memory footprint and improves its speed (for some conditions on the platform's software/hardware that are discussed later) by circumventing the fact that both y and $w_0$ would optimally need to be kept in memory for the following computations. Additionally, this invention leads to reducing the manipulation and hence the leakage of the sensitive variable y in Dilithium implementations on memory-constrained devices.

In the standard Dilithium signature generation given by Algorithm 2, $\tilde{r}$ is computed as: $\tilde{r}=w_0-cs_2$. In this disclose, $\tilde{r}$ is computed as: $\tilde{r}=Az-ct-\alpha w_1$. It can be verified that the results of these equations are equal. This is beneficial for memory constrained devices because the main reason why y cannot be kept in memory (discussed in more details in the previous section) is the fact that $w_0$ is needed to compute $\tilde{r}$. By using the new approach described herein, $w_0$ is no longer needed in the signature generation, as the high bits $w_1$ of w are extracted as its elements are computed from y. This may be achieved using the decomposition gadget described in U.S. patent application Ser. No. 17/832,521 filed on Jun. 3, 2022, title "MASKED DECOMPOSITION OF POLYNOMIALS FOR LATTICE-BASED CRYPTOGRAPHY" (the '521 application) which is hereby incorporated by reference for all purposes as if fully set forth herein. As a result, the memory taken by y does not have to be overwritten by $w_0$ (or w, from which $w_0$ is computed) and hence it is no longer required to re-generate y. This not only saves memory but also saves close to 50% overhead (for software implementations) and is advantageous for side-channel security, because it reduces the amount of leakage on y.

One additional aspect to take into consideration is compliance with the exact specification of Dilithium. In the Dilithium specification the inputs to the signature algorithm are the message and the secret key sk=(ρ, K, tr, $s_1$, $s_2$, $t_0$). Notice that the secret key does not contain the full component t but instead only the low part to due to the public key compression in Dilithium. The public key contains the high part $t_1$, and t can be trivially reconstructed from the low and high parts as $t=t_1 2^d+t_0$. In the version described earlier of this invention, the full t is used to compute $\tilde{r}$. Depending on the context and the implementation, the signing algorithms inputs can be easily changed to take as input the full t or $t_1$ (e.g., if verification after signing, which requires the public key, is implemented as a fault attack countermeasure or if the implementer is in control of the internal signing API). However, if for some reason it is not possible to have access to either t or $t_1$ during signing, different generalizations are provided in Equations 2 and 3 which allow computing $\tilde{r}$ following this method disclosed herein but without requiring t or $t_1$. Precisely, using Equation 2, t can be simply recomputed from the secret key and the matrix A. This requires two masked polynomial matrix vector products as opposed to one for Equation 1. This also results in a non-desirable additional leakage of the secret key. Another option given in Equation 3 does not require another masked polynomial matrix vector product but instead is equivalent to recomputing y from z and $cs_1$. While this would still lead to leakage on y, it should be less critical than the bit manipulation leakage if y were to be re-generated using ExpandMask.

$$r = Az - ct - aw_1 \quad (1)$$

$$= Az - c(As_1 + s_2) - \alpha w_1 \quad (2)$$

$$= A(z - cs_1) - cs_2 - \alpha w_1 \quad (3)$$

In the following description to illustrate the benefits of the approach the first option in Equation 1 is used. Similar advantages/trade-offs can be observed for the other options.

Based on the above described features, a high level overview of a low memory signing algorithm is given in Algorithm 4 that illustrates the proposed new Dilithium signing process.

Algorithm 4-Sign_Low_Mem(sk,M)

```
A = ExpandA(ρ)
μ = H(tr||M)                                              ▷ μ ∈ {0,1}^512
κ = 0, (z, h) =⊥
ρ' = H(K||μ) (or ρ' ←$ {0,1}^512 for randomized signing)  ▷ ρ' ∈ {0,1}^512
while (z, h) =⊥ do
    y = ExpandMask(ρ', κ)                                 ▷ y ∈ S̃_{γ1}^l
    w1 = HighBits(Ay, 2γ2)                                ▷ only w1 is needed
    c̃ = H(μ||w1)                                          ▷ c̃ ∈ {0,1}^256
    c = SampleInBall(c̃)                                   ▷ c ∈ B_τ
    z = y + cs1
    if ||z||∞ ≥ γ1 − β or ||ct0||∞ ≥ γ2 then (z, h) =⊥
    r̃ = Az − ct − αw1                                     ▷ t = t1 · 2^d + t0
    if ||r̃||∞ ≥ γ2 − β then (z, h) =⊥
    else
        h = MakeHint(r̃, c, t0, w1, γ2)
    if (z, h) ≠⊥ then
        if # of 1's in h is greater than ω then (z, h) =⊥
    κ = κ + 1
return σ = (c̃, z, h)
```

Algorithm 5 provides a more detailed view showing how some of the vectors of polynomials are processed to further reduce the memory footprint.

Algorithm 5-Sign_Low_Mem_Detailed(sk,M)

```
A = ExpandA(ρ)
μ = H(tr||M)                                              ▷ μ ∈ {0,1}^512
κ = 0, (z, h) =⊥
ρ' = H(K||μ) (or ρ' ←$ {0,1}^512 for randomized signing)  ▷ ρ' ∈ {0,1}^512
while (z, h) =⊥ do
    y = ExpandMask(ρ', κ)                                 ▷ y ∈ S̃_{γ1}^l
    for i = 0 to k − 1:
        w1[i] = HighBits(Σ_{j=0}^{l−1} A[i, j] · y[j], 2γ2)   ▷ only w1 is needed
    c̃ = H(μ||w1)                                          ▷ c̃ ∈ {0,1}^256
    c = SampleInBall(c̃)                                   ▷ c ∈ B_τ
    z = y + cs1
    if ||z||∞ ≥ γ1 − β or ||ct0||∞ ≥ γ2 then (z, h) =⊥
    i = 0
    while (i < and (z, h) ≠⊥) do                          ▷ check polynomials of r̃ prgressively
        r̃[i] = Az[i] − ct − αw1[i]                        ▷ t = t1 · 2^d + t0
        if ||r̃||∞ ≥ γ2 − β then (z, h) =⊥
        else
            h[i] = MakeHint(r̃[i], c, t0[i], w1[i], γ2)
        i = i + 1
    if (z, h) ≠⊥ then
        if # of 1's in h is greater than ω then (z, h) =⊥
    κ = κ + 1
return σ = (c̃, z, h)
```

First regarding SCA resistance, as previously mentioned, next to the secret key components $s_1$ and $s_2$, y is the most sensitive variable in a Dilithium signature generation. It is more so critical because y is generated using bit manipulation operations. The signing algorithm disclosed herein allows for memory constrained devices, which are also typically the ones requiring SCA protection, to not have to re-generate y. This theoretically reduces the amount of leaking information on y by a factor≈2 (this factor may vary depending on which option/generalization of this invention is chosen), and accordingly also by a factor≈2 the number of side-channel observations needed to break such an implementation using the leakage of y.

Second regarding speed or time efficiency, the low memory signing algorithm disclosed herein trades the re-generation of y using the ExpandMask function for (mainly) the re-generation of the public matrix A, a polynomial matrix vector product and a few polynomial vector operations. This trade-off is approximated using the benchmarks for masked Dilithium level 3 provided in Melissa Azouaoui, Olivier Bronchain, Gaëtan Cassiers, Clément Hoffmann, Yulia Kuzovkova, Joost Renes, Markus Schönauer, Tobias Schneider, François-Xavier Standaert, and Christine van Vredendaal, *Protecting dilithium against leakage: Revisited sensitivity analysis and improved implementations*, IACR Cryptol. ePrint Arch. (2022), 1406 ("Azouaoui") (similar conclusions should hold for all NIST security levels). Table 2 provides a summary where the number of kilo clock cycles spent on ExpandMask and the approximated number of kilo clock cycles spent on instead computing $\tilde{r}=Az-ct-\alpha w_1$ are recalled. The latter is approximated in the worst case by assuming that it takes 3 times the number of clock cycles as performing the matrix vector product Az for a masked z. These clock cycle counts also include the generation of the matrix A. NTT calls are ignored because in the benchmark of Azouaoui they are quite inexpensive in comparison to other operations.

Table 2

| # of shares | 2 | 4 | 6 |
|---|---|---|---|
| $y = \text{ExpandMask}(\rho', \kappa)$ | 24,987 | 70,708 | 131,252 |
| $\tilde{r} = Az - ct - \alpha w_1$ | 3,307 | 4,454 | 5,600 |

It is clear from Table 2 that the embodiments disclosed herein lead to a significant performance gain for this software implementation case. However, the low memory signing algorithm should still lead to notable performance improvements across various kinds of implementations, e.g., using hardware support. This is because computing $\tilde{r}=Az-ct-\alpha w_1$ only entails a linear overhead in the number of shares, because all arithmetic operations (e.g., polynomial multiplications with public values and additions) are more efficient to mask than multiple hash/Keccak calls and secure arithmetic to Boolean conversions involved in ExpandMask for which the overhead is quadratic in the number of shares.

The memory footprint improvements of the low memory signing algorithm will now be described. In all following figures, it is shown by rectangles with solid lines the lifetimes of variables that do not need to be masked and that are also already relatively small (e.g., the 1-bit vector h in the standard Dilithium signing) or compressed to a smaller size (e.g., at some point only 1 bit per coefficient of $w_1$ is needed). Rectangles with dashed lines denote the lifetime of sensitive variables, i.e., variables that have to remain secret and protected from side-channel leakage using masking. Some of these variables can be unmasked after the rejection checks. Dashed lines are used to show that for some specific operations, inputs can be overwritten by the result hence saving memory, e.g., polynomial additions for which this is straightforward. For simplicity, variables that do not affect the invention or the memory improvements of the low memory singing algorithm are ignored.

Figure 2:
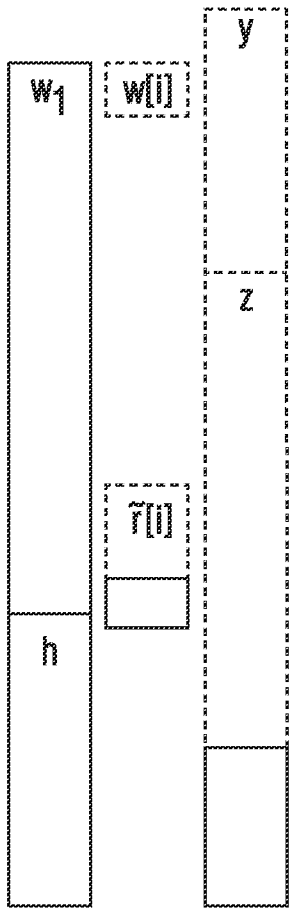
FIG. 2 illustrates the memory lifetime of different variables during a Dilithium signature generation using a low memory signing algorithm as demonstrated in Algorithm 5.

FIG. 1 illustrates the memory lifetime of different variables during a standard Dilithium signature generation following Algorithm 2. FIG. 2 illustrates the memory lifetime of different variables during a Dilithium signature generation using a low memory signing algorithm as demonstrated in Algorithm 5. For simplicity small, public, or non-sensitive (that do not require masking) variables will be ignored such as c, $\tilde{c}$, h, A and $t_0$. The lifespan of $w_1$ is shown using rectangles with solid line because after the hash at line 9 its 4-bit coefficients can be further compressed to 1-bit values. Masking $w_1$ in this disclosure may not be necessary based on the recent literature. However, if it is desirable or needed then it is compatible with the embodiments disclosed herein (the '384 application provides more details on masking $w_1$).

This low memory signing algorithm is useful for memory-constrained devices. A 2-share masked Dilithium implementation with less than 11 KiB of RAM cannot keep both y and w. The main solution is to re-generate y when needed. This is shown in FIG. 1, where y is first needed to compute w, which overwrites it, and then later on to compute z. This increases both the leakage on y and implies an overhead due to a second call to ExpandMask.

The low memory signing algorithm and its memory footprint are illustrated in FIG. 2. Mainly, because it is proposed to compute $\tilde{r}$ differently, from z and $w_1$ and other public values, only one polynomial of w is needed at a time and $w_0$ is not needed at all. As a result, y can be kept in memory and it is no longer necessary to re-generate it. To further reduce the memory footprint, it is also suggested that because $\tilde{r}$ is not needed for the final signature to process it progressively, for instance one polynomial of the polynomial vector at a time. Accordingly, it is only required to keep a masked vector of polynomials and one masked polynomial in memory at a time without the need to re-generate y.

A comparison between the low memory signing algorithm disclosed herein and the '384 application will now be provided. In the low memory signing algorithm disclosed herein, as opposed to the '384 application, the order of the computations of z and f remains the same. Instead $\tilde{r}$ is computed differently, whereas in the '384 application it is computed the standard way as $\tilde{r}=w_0-cs_2$. Notably, the '384 application still requires re-generating y for implementations on memory-constrained devices. The order of the checks in the '384 application also induces the need to mask MakeHint, whereas it is not needed in the low memory signing algorithm described herein because z and the relevant polynomial of $\tilde{r}$ have already been checked before the hint computation. Still, the masked MakeHint algorithm given in the '384 application can be used in the low memory signing algorithm disclosed herein if masking the hint computation or $w_1$ is desirable or if the order of the checks is changed resulting in still sensitive hints.

Figure 3:
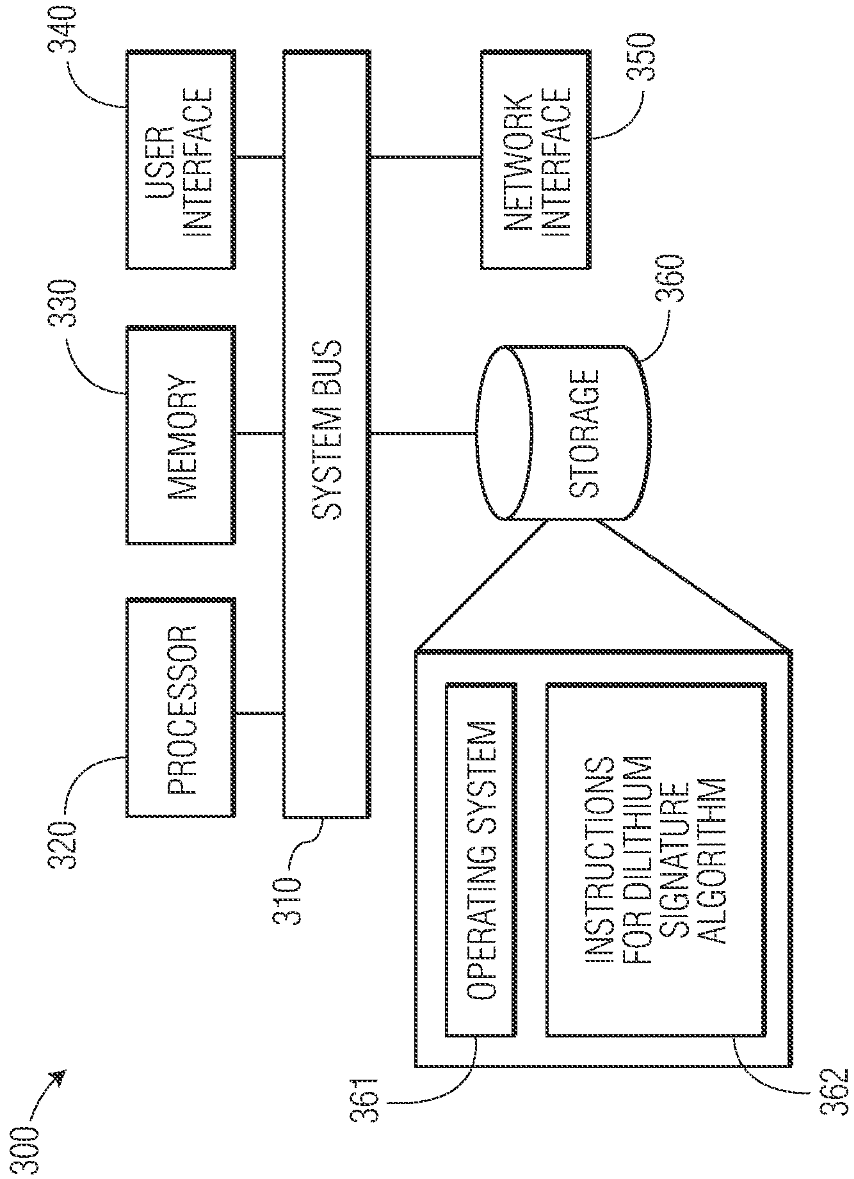
FIG. 3 illustrates an exemplary hardware diagram for implementing a low memory signature algorithm.

FIG. 3 illustrates an exemplary hardware diagram 300 for implementing a low memory signature algorithm. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 340 may include one or more devices for enabling communication with a user such as an administrator. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. Storage 362 may include instructions for carrying out the low memory signature algorithm disclosed herein.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

The system bus 310 allows communication between the processor 320, memory 330, user interface 340, storage 360, and network interface 350.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Furthermore, as used herein, the terms “set” and “group” are intended to include one or more items (e.g., related items, unrelated items, a combination of related and unrelated items, and/or the like), and may be used interchangeably with “one or more.” Where only one item is intended, the phrase “only one” or similar language is used. Also, as used herein, the terms “has,” “have,” “having,” and/or the like are intended to be open-ended terms. Further, the phrase “based on” is intended to mean “based, at least in part, on” unless explicitly stated otherwise.

The invention claimed is:

1. A method of performing, using a hardware processor of a computing device, a Dilithium signature operation on a message M using a secret key sk, the method comprising:

generating a polynomial y using an ExpandMask function;

calculating a polynomial z based upon y, c, and $s_1$, where $s_1$ is part of the secret key sk and replacing y with z in a memory;

performing a bound check on z based upon $\gamma_1$ and $\beta$, where $\gamma_1$ and $\beta$ are parameters of the Dilithium signature operation;

performing a bound check on $ct_0$ based upon $\gamma_2$, where $\gamma_2$ is a parameter of the Dilithium signature operation, c is based upon a hash of the message M, and polynomial $t_0$ is part of the secret key sk;

calculating a polynomial $\tilde{r}$ based upon A, z, c, t, $\alpha$, and $w_1$, where A and $w_1$ are calculated as part of the Dilithium signature operation, $\alpha$ is a parameter of the Dilithium signature operation, and polynomial t is an addition of a polynomial $t_1$ scaled by $2^d$ and the polynomial $t_0$ where polynomial $t_1$ is part of a public key pk;

performing a bound check on $\tilde{r}$ based upon $\gamma_2$ and $\beta$;

calculating a hint polynomial h based on the $\tilde{r}$; and returning a digital signature of the message M where the digital signature includes z and h.

2. The method of claim 1, wherein calculating z includes calculating $z=y+cs_1$.

3. The method of claim 1, wherein performing a bound check on z includes determining if $\|z\|_\infty \geq \gamma_1-\beta$.

4. The method of claim 1, wherein performing a bound check on $ct_0$ includes determining if $\|ct_0\|_\infty \geq \gamma_2$.

5. The method of claim 1, wherein calculating a polynomial $\tilde{r}$ includes repeating for each polynomial vector element of the polynomial $\tilde{r}$ the steps of:

calculating one polynomial vector element of the polynomial $\tilde{r}$ based upon A, z, c, t, $\alpha$, and $w_1$;

performing a bound check on the one polynomial vector element of $\tilde{r}$ based upon $\gamma_2$ and $\beta$; and calculating one polynomial vector element of the hint polynomial h based on the $\tilde{r}$.

6. The method of claim 1, wherein calculating a polynomial $\tilde{r}$ includes calculating $\tilde{r}[i]=Az[i]-ct[i]-\alpha w_1[i]$ where i is an integer index specifying a polynomial of the vectors $\tilde{r}$, z, t, and $w_1$.

7. The method of claim 6, wherein performing a bound check on $\tilde{r}$ includes determining if ||r̃[i] ⊢ ⊣||_∞≥γ_2−β.

8. The method of claim 6, wherein calculating a hint polynomial h is further based on c, $t_0$, $w_1$, and $\gamma_2$, where $t_0$ is part of the secret key sk, where $w_1$ is calculated as part of the Dilithium signature operation, and where $\gamma_2$ is a parameter of the Dilithium signature operation.

9. The method of claim 1, wherein calculating a polynomial $\tilde{r}$ includes calculating $\tilde{r}[i]=Az[i]-c(As_1[i]+s_2[i])-\alpha w_1[i]$ where i is an integer index specifying a polynomial of the vectors $\tilde{r}$, z, $s_1$, $s_2$, and $w_1$.

10. The method of claim 1, wherein calculating a polynomial $\tilde{r}$ includes calculating $\tilde{r}[i]=A(z[i]-cs_1[i])-cs_2[i]-\alpha w_1[i]$ where i is an integer index specifying a polynomial of the vectors $\tilde{r}$, z, $s_1$, $s_2$, and $w_1$.

11. The method of claim 1, further comprising determining if a number of 1's in h is greater than $\omega$, where $\omega$ is a parameter of the Dilithium signature operation.

12. The method of claim 1, wherein $\tilde{r}$, z, and y are masked using a plurality of shares.

13. A data processing system comprising instructions embodied in a non-transitory computer readable medium, the instructions for a method of performing a Dilithium signature operation on a message M using a secret key sk, the instructions, comprising:

generating a polynomial y using an ExpandMask function;

calculating a polynomial z based upon y, c, and $s_1$, where $s_1$ is part of the secret key sk and replacing y with z in a memory;

performing a bound check on z based upon $\gamma_1$ and $\beta$, where $\gamma_1$ and $\beta$ are parameters of the Dilithium signature operation;

performing a bound check on $ct_0$ based upon $\gamma_2$, where $\gamma_2$ is a parameter of the Dilithium signature operation, c is based upon a hash of the message M, and polynomial $t_0$ is part of the secret key sk;

calculating a polynomial $\tilde{r}$ based upon A, z, c, t, $\alpha$, and $w_1$, where A and $w_1$ are calculated as part of the Dilithium signature operation, $\alpha$ is a parameter of the Dilithium signature operation, and polynomial t is an addition of a polynomial $t_1$ scaled by $2^d$ and the polynomial $t_0$ where polynomial $t_1$ is part of a public key pk;

performing a bound check on $\tilde{r}$ based upon $\gamma_2$ and $\beta$;

calculating a hint polynomial h based on the $\tilde{r}$; and returning a digital signature of the message M where the digital signature includes z and h.

14. The data processing system of claim 13, wherein calculating z includes calculating $z=y+cs_1$.

15. The data processing system of claim 13, wherein performing a bound check on z includes determining if $\|z\|_\infty \geq \gamma_1-\beta$.

16. The data processing system of claim 13, wherein performing a bound check on $ct_0$ includes determining if $\|ct_0\|_\infty \geq \gamma_2$.

17. The data processing system of claim 13, wherein calculating a polynomial $\tilde{r}$ includes repeating for each polynomial vector element of the polynomial $\tilde{r}$ the steps of:

calculating one polynomial vector element of the polynomial $\tilde{r}$ based upon A, z, c, t, $\alpha$, and $w_1$;

performing a bound check on the one polynomial vector element of $\tilde{r}$ based upon $\gamma_2$ and $\beta$; and calculating one polynomial vector element of the hint polynomial h based on the $\tilde{r}$.

18. The data processing system of claim 13, wherein calculating a polynomial $\tilde{r}$ includes calculating $\tilde{r}[i]=Az[i]-ct[i]-\alpha w_1[i]$ where i is an integer index specifying a polynomial of the vectors $\tilde{r}$, z, t, and $w_1$.

19. The data processing system of claim 18, wherein performing a bound check on $\tilde{r}$ includes determining if $\|\tilde{r}[i] \vdash \dashv\|\_\infty \geq \gamma\_2-\beta$.

20. The data processing system of claim 18, wherein calculating a hint polynomial h is further based on c, $t_0$, $w_1$, and $\gamma_2$, where $t_0$ is part of the secret key sk, where $w_1$ is calculated as part of the Dilithium signature operation, and where $\gamma_2$ is a parameter of the Dilithium signature operation.

21. The data processing system of claim 13, wherein calculating a polynomial $\tilde{r}$ includes calculating $\tilde{r}[i]=Az[i]-c(As_1[i]+s_2[i])-\alpha w_1[i]$ where i is an integer index specifying a polynomial of the vectors $\tilde{r}$, z, $s_1$, $s_2$, and $w_1$.

22. The data processing system of claim 13, wherein calculating a polynomial $\tilde{r}$ includes calculating $\tilde{r}[i]=A(z[i]-cs_1[i])-cs_2[i]-\alpha w_1[i]$ where i is an integer index specifying a polynomial of the vectors $\tilde{r}$, z, $s_1$, $s_2$, and $w_1$.

23. The data processing system of claim 13, further comprising determining if a number of 1's in h is greater than ω, where ω is a parameter of the Dilithium signature operation.

24. The data processing system of claim 13, wherein $\tilde{r}$, z, and y are masked using a plurality of shares.

* * * * *